United States Patent
Thiele et al.

(10) Patent No.: US 10,965,216 B2
(45) Date of Patent: Mar. 30, 2021

(54) INTEGRATED CIRCUITS WITH CURRENT LIMIT CLAMPS AND SKIP CLAMPS FOR POWER CONVERTERS

(71) Applicant: TEXAS INSTRUMENTS INCORPORATED, Dallas, TX (US)

(72) Inventors: Gerhard Thiele, Dachau (DE); Manuel Wiersch, Freising (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/141,063

(22) Filed: Sep. 25, 2018

(65) Prior Publication Data

US 2020/0099299 A1 Mar. 26, 2020

(51) Int. Cl.
*H02M 3/158* (2006.01)
*H02M 1/08* (2006.01)
*H02M 1/00* (2006.01)

(52) U.S. Cl.
CPC .......... *H02M 3/1582* (2013.01); *H02M 1/08* (2013.01); *H02M 2001/0009* (2013.01)

(58) Field of Classification Search
CPC ...... H02M 3/1582; H02M 3/156; H02M 1/08; H02M 2001/0009
See application file for complete search history.

(56) References Cited

U.S. PATENT DOCUMENTS

2004/0196055 A1 10/2004 Pearce et al.
2006/0279268 A1* 12/2006 Yu .......................... H02M 3/156
                                                                    323/282

FOREIGN PATENT DOCUMENTS

EP          1124315 A1     8/2001

OTHER PUBLICATIONS

"TPS54020 Small, 10-A, 4.5-V to 17-V input, SWIFT™ synchronous step-down converter with light-load efficiency", Datasheet, Texas Instruments, 2012 (Year: 2012).*
PCT Search Report for Application No. PCT /US 2019/052651, dated Mar. 26, 2020.

* cited by examiner

*Primary Examiner* — Matthew V Nguyen
*Assistant Examiner* — Jye-June Lee
(74) *Attorney, Agent, or Firm* — Mark Allen Valetti; Charles A. Brill; Frank D. Cimino

(57) ABSTRACT

An integrated circuit comprising: a high-side pMOSFET comprising a drain and a gate; a node coupled to the drain of the high-side pMOSFET; a voltage-to-current circuit comprising a first nMOSFET and a first resistor, the first nMOSFET comprising a gate and a source, the first resistor comprising a terminal coupled to the source of the first nMOSFET; an error amplifier comprising an output port coupled to the gate of the first nMOSFET; a skip clamp nMOSFET comprising a source coupled to the output port of the error amplifier; and a current limit clamp pMOSFET comprising a source coupled to the output port of the error amplifier.

18 Claims, 4 Drawing Sheets

INTEGRATED CIRCUITS WITH CURRENT LIMIT CLAMPS AND SKIP CLAMPS FOR POWER CONVERTERS

BACKGROUND

A switching DC-to-DC voltage converter, when powered by a DC power source, provides power to a load. An inductor is coupled to a switching node of the DC-to-DC voltage converter and stores energy during operation. In a buck, boost, or buck-boost DC-to-DC voltage converter, the load voltage is regulated to be less than, greater than, or the negative of the supply voltage of the DC power source, respectively. When operating in a current mode, the DC-to-DC voltage controller switches the inductor based on the inductor current. For example, under heavy load conditions when operating in a current mode, the DC-to-DC voltage controller monitors current through the inductor and controls switching of the inductor to prevent the inductor current from exceeding a maximum current value.

SUMMARY

In accordance with at least one example of the disclosure, an integrated circuit comprising: a high-side pMOSFET comprising a drain and a gate; a node coupled to the drain of the high-side pMOSFET; a voltage-to-current circuit comprising a first nMOSFET and a first resistor, the first nMOSFET comprising a gate and a source, the first resistor comprising a terminal coupled to the source of the first nMOSFET; an error amplifier comprising an output port coupled to the gate of the first nMOSFET; a skip clamp nMOSFET comprising a source coupled to the output port of the error amplifier; and a current limit clamp pMOSFET comprising a source coupled to the output port of the error amplifier.

In accordance with at least one example of the disclosure, a system comprising: an inductor comprising a first terminal and a second terminal; a voltage divider coupled to the second terminal of the inductor; an integrated circuit comprising: a high-side pMOSFET comprising a gate, and a drain coupled to the first terminal of the inductor; a voltage-to-current circuit comprising a first nMOSFET and a first resistor, the first nMOSFET comprising a gate and a source, the first resistor comprising a terminal coupled to the source of the first nMOSFET; a voltage reference; an error amplifier comprising an output port coupled to the gate of the first nMOSFET, a first input port coupled to the voltage reference, and a second input port coupled to the voltage divider; a skip clamp nMOSFET comprising a source coupled to the output port of the error amplifier; and a current limit clamp pMOSFET comprising a source coupled to the output port of the error amplifier.

In accordance with at least one example of the disclosure, an integrated circuit comprising: a high-side pMOSFET comprising a drain and a gate; a node coupled to the drain of the high-side pMOSFET; a voltage-to-current circuit comprising a first nMOSFET and a first resistor, the first nMOSFET comprising a gate and a source, the first resistor comprising a terminal coupled to the source of the first nMOSFET; an error amplifier comprising an output port coupled to the gate of the first nMOSFET; a skip clamp nMOSFET comprising a source coupled to the output port of the error amplifier; and a current limit clamp pMOSFET comprising a source coupled to the output port of the error amplifier; a second nMOSFET matched to the first nMOSFET, the second nMOSFET comprising a gate coupled to the output port of the error amplifier, a drain, and a source; and a second resistor matched to the first resistor, the second resistor comprising a terminal coupled to the source of the second nMOSFET.

BRIEF DESCRIPTION OF THE DRAWINGS

For a detailed description of various examples, reference will now be made to the accompanying drawings in which.

DETAILED DESCRIPTION

In current-mode based DC-to-DC voltage converters, an error amplifier—as part of a feedback loop-provides a regulation voltage to control the inductor current. When the DC-to-DC voltage converter is in an over-current condition, it is desirable to prevent the regulation voltage from exceeding a current limit clamp voltage; and when the DC-to-DC voltage converter is in a skip mode, it is desirable to prevent the regulation voltage from falling below a skip clamp voltage. Conventional DC-to-DC voltage converters utilize different reference and feedback paths for the current-limit and skip modes, requiring separate trimming. Embodiments described herein include current-limit and skip clamps, with one reference path and one feedback path. A voltage-to-current circuit is used to generate a feedback signal to the current-limit and skip clamps. Fast clamping is achieved with a small bias current.

Figure 1:
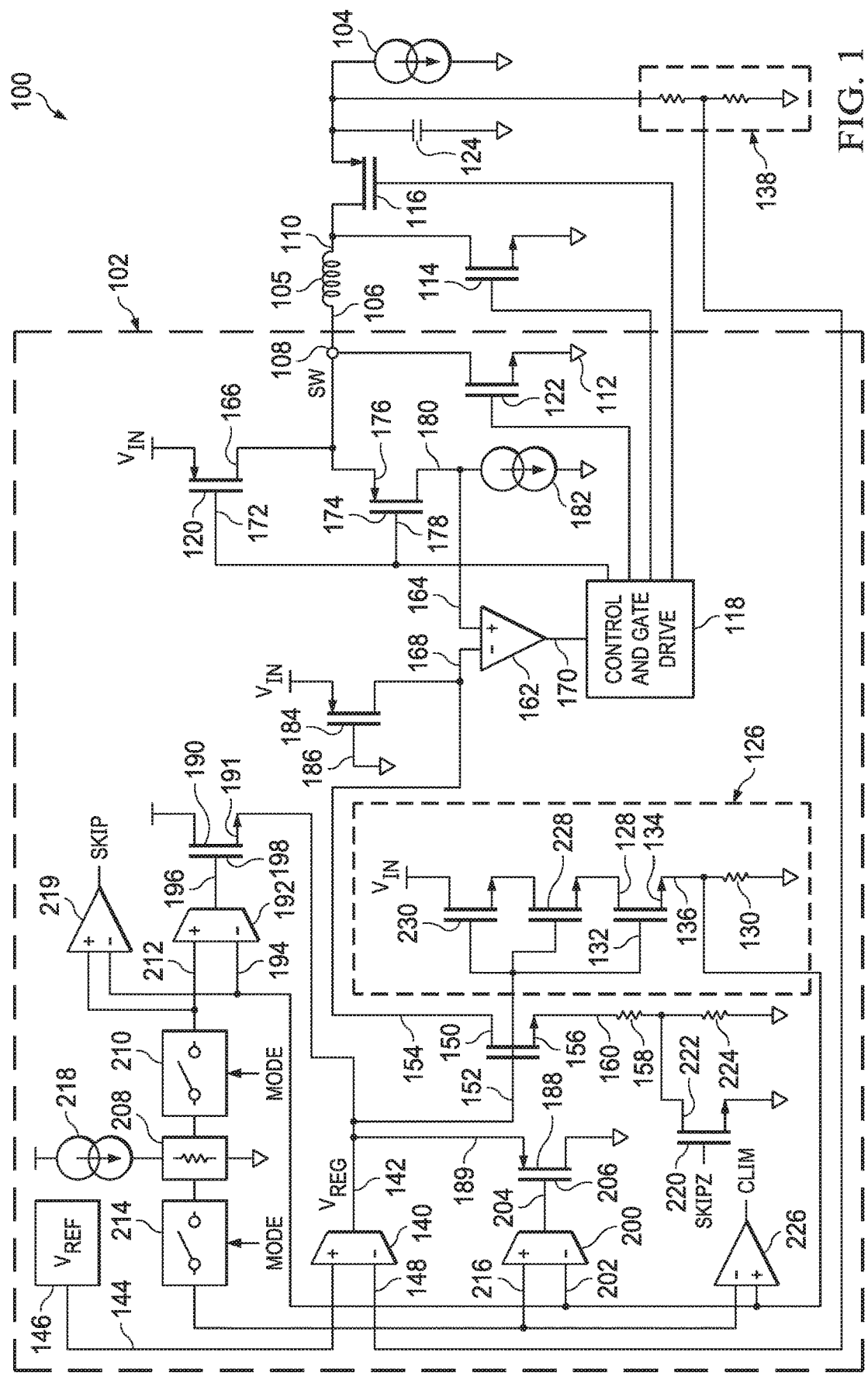
FIG. 1 shows a system in accordance with various examples.

FIG. 1 depicts a system 100, including an integrated circuit 102, to provide the functionality of a DC-to-DC voltage converter. A power supply (not shown) provides an input voltage $V_{IN}$, as shown in FIG. 1, where a regulated voltage is provided to a load 104. When the system 100 is operated in a buck mode, the regulated voltage provided to the load 104 is less than the input voltage $V_{IN}$, whereas when the system 100 is operated in a boost mode, the regulated voltage provided to the load 104 is greater than the input voltage $V_{IN}$, where the convention is taken that the input voltage $V_{IN}$ is positive with respect to the ground 112. When in the buck-boost mode, the magnitude of the regulated voltage can be less than or greater than the input voltage.

An inductor 105 comprises a first terminal 106 coupled to a node 108, and a second terminal 110 coupled to the load 104. The node 108 can also be referred to as a switching node. The second terminal 110 of the load 104 is coupled to the load 104 by way of transistors 114 and 116, where the transistors 114 and 116 serve as switches controlled by a control and gate drive module 118. The control and gate drive module 118 is coupled to a high-side p-Metal-Oxide-Semiconductor Field-Effect-Transistor (pMOSFET) 120 and a low-side n-Metal-Oxide-Semiconductor Field-Effect-Transistor (nMOSFET) 122. An output capacitor 124 is coupled to the load 104 to smooth out the regulated voltage.

Controlling the switching of the transistors 120, 122, 116 and 114 determines the mode of operation. As examples, when operating in the buck mode, the transistors 114 and 116 are not needed (if present, the transistor 114 can be kept OFF and the transistor 116 can be kept ON), and the control and gate drive module 118 alternately switches ON and OFF the high-side pMOSFET 120 and the low-side nMOSFET 122. When operating in the boost mode, the high-side pMOSFET 120 and the low-side nMOSFET 122 are not needed (if present, the high-side pMOSFET 120 is kept ON and the low-side nMOSFET 122 is kept OFF), and the control and gate drive module 118 alternatively switches ON and OFF the transistor 114 and the transistor 116. In the buck-boost mode, the system 100 alternates between a boost-phase and a buck-phase, beginning with a boost-phase.

A voltage-to-current circuit 126 comprises a first nMOSFET 128 and a first resistor 130, the first nMOSFET 128 comprising a gate 132 and a source 134, the first resistor 130 comprising a terminal 136 coupled to the source 134 of the first nMOSFET 128. The voltage-to-current circuit 126 provides a threshold voltage used to determine when the system 100 is in a skip mode or a current limit condition. However, before describing in detail the function of the voltage-to-current circuit 126, various components in the system 100 are discussed with respect to their function in the system 100 providing the regulated voltage provided to the load 104.

A voltage divider 138 is coupled to the second terminal 110 of the inductor 105, and provides a feedback signal to an error amplifier 140. The error amplifier 140 comprises an output port 142 coupled to the gate 132 of the first nMOSFET 128, a first input port 144 coupled to a voltage reference 146, and a second input port 148 coupled to the voltage divider 138. A second nMOSFET 150 comprises a gate 152 coupled to the output port 142 of the error amplifier 140, a drain 154, and a source 156. A second resistor 158 comprises a terminal 160 coupled to the source 156 of the second nMOSFET 150.

A comparator 162 comprises a first input port 164 coupled to the drain 166 of the high-side pMOSFET 120, a second input port 168 coupled to the drain 154 of the second nMOSFET 150, and an output port 170 coupled to the gate 172 of the high-side pMOSFET 120. Note that by way of the node 108, the drain 166 of the high-side pMOSFET 120 is coupled to the first terminal 106 of the inductor 105. The control and gate drive module 118 is coupled to the output port 170 of the comparator 162 and to the gate 172 of the high-side pMOSFET 120. The output port 170 of the comparator 162 is coupled to the gate 172 of the high-side pMOSFET 120 by way of the control and gate drive module 118.

A first pMOSFET 174 comprises a source 176 coupled to the drain 166 of the high-side pMOSFET 120, a gate 178 coupled to the gate 172 of the high-side pMOSFET 120, and a drain 180 coupled to the first input port 164 of the comparator 162. The first input port 164 of the comparator 162 is coupled to the drain 166 of the high-side pMOSFET 120 by way of the first pMOSFET 174.

A current source 182 biases the first pMOSFET 174. The gate 178 of the first pMOSFET 174 is coupled to the gate 172 of the high-side pMOSFET 120, where the control and gate drive module 118 is coupled to both of the gates 178 and 172. In this way, the control and gate drive module 118 controls the states of both the high-side pMOSFET 120 and the first pMOSFET 174. The configuration of the first pMOSFET 174 and the current source 182 serves as a voltage shift circuit, so that the voltage at the first input port 164 of the comparator 162 is indicative of the voltage at the drain 166 of the high-side pMOSFET 120, but is shifted by the drain-source on-resistance voltage drop of the first pMOSFET 174 when the first pMOSFET 174 is ON. The voltage drop across pMOSFET 174 is necessary to regulate negative currents in the inductor 105. The maximum negative current can be adjusted by either the size of the pMOSFET 174 or the current supplied by the current source 182.

In FIG. 1, the voltage of the output port 142 of the error amplifier 140 is denoted as a regulation voltage $V_{REG}$. With the output port 142 of the error amplifier 140 coupled to the gate of the second nMOSFET 150, the regulation voltage $V_{REG}$ is provided to the gate 152. A second pMOSFET 184 with a gate 186 held at ground provides current to the second nMOSFET 150, so that the voltage developed at the second input port 168 of the comparator 162 is indicative of the regulation voltage $V_{REG}$ at the output port 142 of the error amplifier 140. The MOSFET 184 is used as a sense transistor and generates a voltage drop across it, depending on the sense current generated by the nMOSFET 150 and the second resistor 158.

The regulation voltage $V_{REG}$ is indicative of the difference of the feedback voltage of the voltage divider 138 and a reference voltage provided by the voltage reference 146. With the regulation voltage $V_{REG}$ affecting the voltage at the second input port 168 of the comparator 162, and with the comparator 162 comparing the voltage at the second input port 168 to a level shifted version of the voltage at the drain 166, which is also the voltage at the node 108, the control and gate drive module 118 controls the switching of the high-side pMOSFET 120 and some combination of the transistors 122, 114, 116 (depending upon the mode of operation) so as to provide a regulated voltage to the load 104.

When the system 100 is in an over-current condition, a current limit clamp pMOSFET 188 turns ON to clamp the regulation voltage $V_{REG}$ so as not to exceed a current limit clamp voltage. The current limit clamp pMOSFET 188 comprises a source 189 coupled to the output port 142 of the error amplifier 140 to clamp the regulation voltage $V_{REG}$ when turned ON. When the system 100 is in a skip mode, a skip clamp nMOSFET 190 turns ON to clamp the regulation voltage $V_{REG}$ so as not to fall below a skip clamp voltage. The skip clamp nMOSFET 190 comprises a source 191 coupled to the output port 142 of the error amplifier 140 to clamp the regulation voltage $V_{REG}$ when turned ON.

To determine when to turn ON the current limit clamp pMOSFET 188 or the skip clamp nMOSFET 190, the voltage-to-current circuit 126 generates a feedback signal generated at the first terminal 136 of the first resistor 130. A first transconductance amplifier 192 comprises a first input port 194 coupled to the first terminal 136 of the first resistor 130, and an output port 196 coupled to the gate 198 of the skip clamp nMOSFET 190. A second transconductance amplifier 200 comprises a first input port 202 coupled to the first terminal 136 of the first resistor 130, and an output port 204 coupled to the gate 206 of the current limit clamp pMOSFET 188.

The illustrative integrated circuit 102 further comprises a resistor ladder network 208; a first switch network 210 coupled to the resistor ladder network 208 and to a second input port 212 of the first transconductance amplifier 192; and a second switch network 214 coupled to the resistor ladder network 208 and to a second input port 216 of the second transconductance amplifier 200. A current source 218 biases the resistor ladder network 218 to generate a set of voltages, where the first and second switch networks 210 and 214, depending upon the operating mode (buck mode, buck-boost mode, boost mode) of the illustrative integrated circuit 102, select voltages among this set of voltages to provide to the transconductance amplifiers 192 and 200. The selected voltages serve as thresholds, where the transconductance amplifiers 192 and 200 turn ON or OFF the skip clamp nMOSFET 190 or the current limit clamp pMOSFET 188 depending upon whether the feedback signal developed at the first resistor 130 of the voltage-to-current circuit 126 is less than or greater than the thresholds, discussed further with respect to the timing diagram of FIG. 2.

Figure 2:
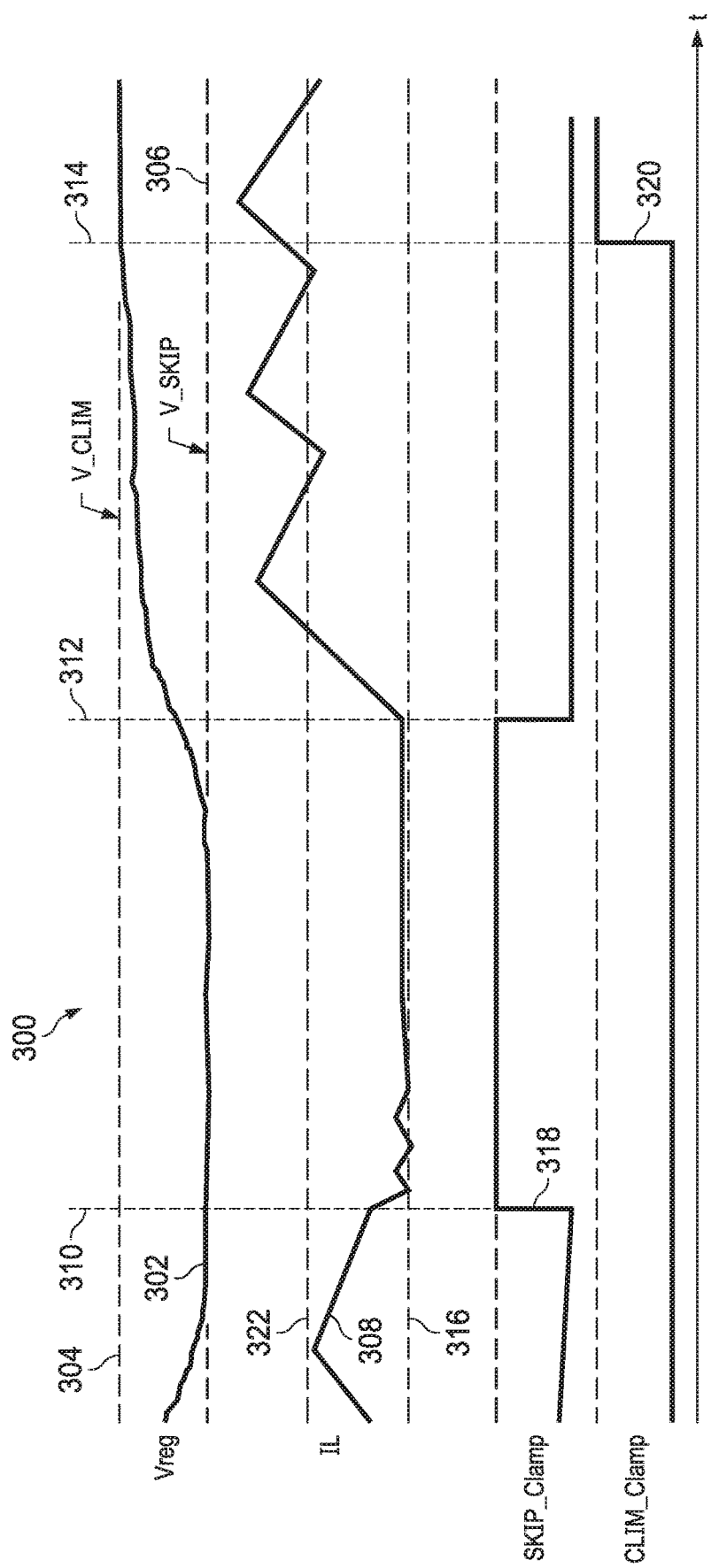
FIG. 2 shows a timing diagram in accordance with various examples.

FIG. 2 shows a timing diagram 300 for the illustrative integrated circuit 102, illustrating several signals over a time interval. A curve 302 labeled $V_{REG}$ represents the regulation voltage $V_{REG}$ at the output port 142 of the error amplifier 140. A curve 304 labeled V_CLIM is a desired upper limit for the regulation voltage $V_{REG}$, indicating when the system 100 is in an over-current condition and the current limit clamp pMOSFET 188 is turned ON. A curve 306 labeled V_SKIP is a desired lower limit for the regulation voltage $V_{REG}$, indicating when the system 100 is in a skip mode and the skip clamp nMOSFET 190 is turned ON. A curve 308 labeled IL represents current flowing through the inductor 105.

The value of V_CLIM is the output voltage provided by the error amplifier 140 at the output port 142 when the voltage developed at the first resistor 130 (provided at the first input port 202 of the second transconductance amplifier 200) equals the voltage at the second input port 216 (provided by the second switch network 214). The value of V_SKIP is the output voltage provided by the error amplifier 140 at the output port 142 when the voltage developed at the first resistor 130 (provided at the first input port 194 of the first transconductance amplifier 192) equals the voltage at the second input port 212 (provided by the first switch network 210).

At a time 310, the system 100 enters a skip mode, where the skip clamp nMOSFET 190 is turned ON to prevent the regulation voltage $V_{REG}$ from falling below V_SKIP. A curve 318 labeled SKIP_Clamp denotes the state of the skip clamp nMOSFET 190. During the skip mode, the current through the inductor 105 is at a lower threshold 316. A comparator 219 asserts a skip signal (SKIP in FIG. 1) when the system 100 enters a skip mode. The logical complement of the skip signal is provided to a gate 220 of an nMOSFET 222, so that when the skip signal is asserted, a resistor 224 is effectively coupled in series with the second resistor 158, thereby reducing current through the second pMOSFET 184. As a result, biasing current is reduced during the skip mode. When reducing the biasing current, there may be significant distortion at the node 160. By using the parallel branch and sensing the signal at the node 136, the distortion at the inputs 200, 219, 226, and 192 is reduced. The skip signal SKIP can be provided to other circuits (not shown). At a time 312, the system 100 exits the skip mode, and the skip clamp nMOSFET 190 is turned OFF as indicated by the curve 318.

At a time 314, the inductor current has been sufficiently above a threshold 322 so that the system 100 is put into an over-current condition, where the current limit clamp pMOSFET 188 is turned ON to prevent the regulation voltage $V_{REG}$ from exceeding V_CLIM. A curve 320 labeled CLIM_Clamp indicates the state of the current limit clamp pMOSFET 188. A comparator 226 asserts a current limit signal (CLIM in FIG. 1) when the system 100 enters an over-current condition. The current limit signal CLIM can be provided to other circuits (not shown).

The gate 198 of the skip clamp nMOSFET 190 is coupled to the first terminal 136 of the first resistor 130 by way of the first transconductance amplifier 192; and the gate 206 of the current limit clamp pMOSFET 188 is coupled to the first terminal 136 of the first resistor 130 by way of the second transconductance amplifier 200. In some embodiments, the second nMOSFET 150 is matched to the first nMOSFET 128, and in some embodiments the second resistor 158 is matched to the first resistor 130. In some embodiments, one or more nMOSFETs (labeled 228 and 230) are coupled in series with the first nMOSFET 128, each having a gate coupled to the gate 152 of the second nMOSFET 150 and matched to the first nMOSFET 128. In some embodiments, the second pMOSFET 184 is matched to the high-side pMOSFET 120, and the first pMOSFET 174 is matched to the second pMOSFET 184 and the high-side pMOSFET 120.

In some embodiments, the voltage-to-current circuit 126 is a replica of a voltage-to-current circuit composed of 150, 160, 220, 224. The stacked transistors 230, 228, and 128 are coupled to a voltage input $V_{IN}$, instead of to the drain of the second pMOSFET 184 like that of transistor 150. This can be advantageous for generation of a sense current. In low voltage operations, the drain-source voltage drop across the second pMOSFET 184 is avoided. This can cause a slight inaccuracy due to the voltage-to-current circuit 126 not experiencing the same drain-source voltage drop as the voltage-to-current circuit composed of 150, 160, 220, 224, but this can be advantageous because the proper voltage across the resistor 130 is provided even if the second pMOSFET 184 enters the saturation region (especially at low $V_{IN}$).

Figure 3:
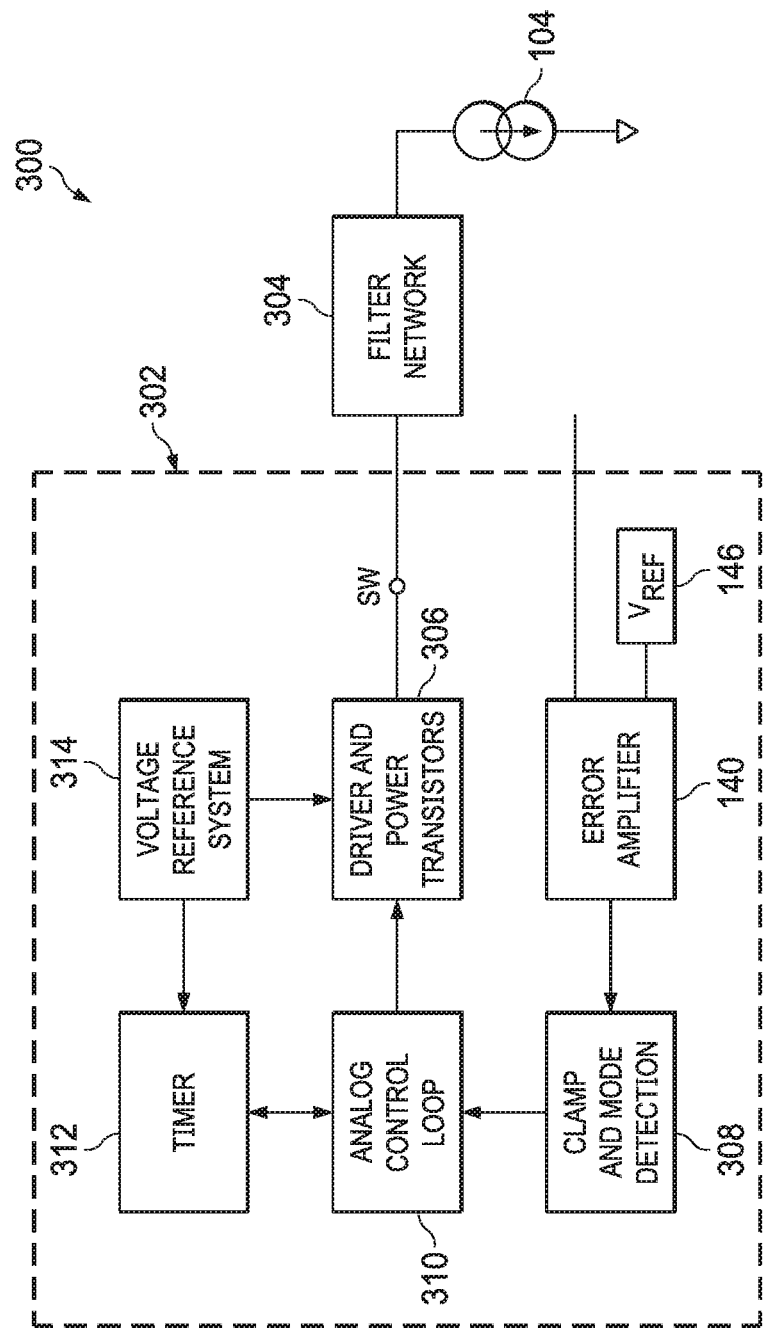
FIG. 3 shows a system in accordance with various examples.

FIG. 3 shows a system 300, illustrating a high-level abstraction for a technical environment for the system 100 of FIG. 1. An illustrative integrated circuit 302 comprises various modules described with respect to the example circuit of FIG. 1. A filter network 304 is configured to deliver power from a driver and power transistors module 306 to the load 104, where the configuration depends upon the mode of operation, e.g., buck, boost, or buck-boost operation. A clamp and mode detection module 308 detects the skip mode or the current limit condition, and an analog control loop module 310 controls the driver and power transistors module 306 depending upon the mode detected by the clamp and mode detection module 308, as described with respect to the embodiment of FIG. 1. The error amplifier 140 and the voltage reference 146 illustrated in FIG. 3 provide the same functionality as their counterparts in FIG. 1. A timer module 312 and a voltage reference system module 314 provide timing signals and voltage signals to the analog control loop module 310 and the driver and power transistors module 306.

Figure 4:
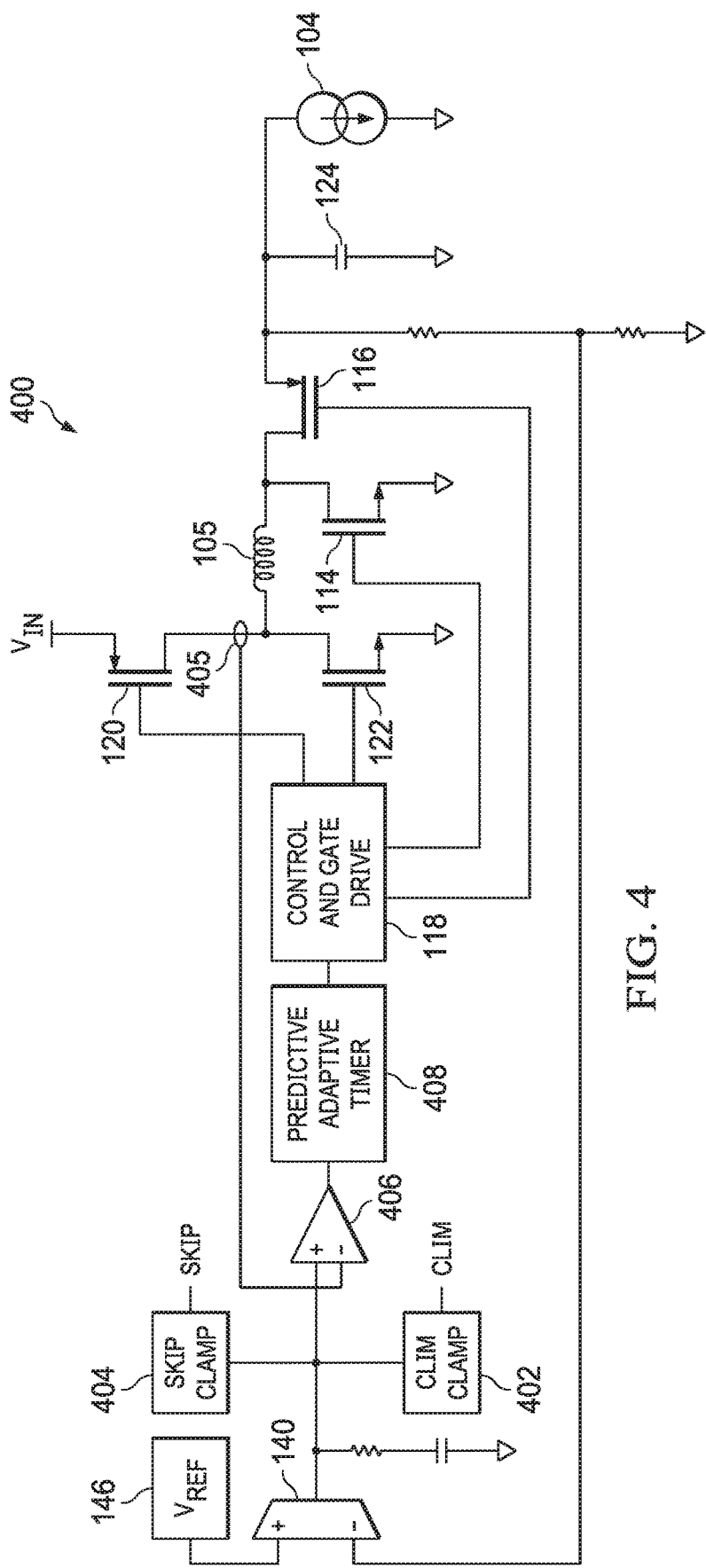
FIG. 4 shows a system in accordance with various examples.

FIG. 4 shows a system 400, illustrating an example of an abstraction of the system 100 of FIG. 1, but at a more detailed level of abstraction than that of the example of FIG. 3. The error amplifier 140 and the voltage reference 146 illustrated in FIG. 3 provide the same functionality as their counterparts in FIG. 1. A CLIM clamp module 402 clamps the regulation voltage $V_{REG}$ so as not to exceed a current limit clamp voltage, and provides the current limit signal CLIM. A SKIP clamp module 404 clamps the regulation voltage $V_{REG}$ so as not to fall below a skip clamp voltage, and provides the skip signal SKIP.

A current sense module 405, an amplifier module 406, and a predictive adaptive timer module 408 form part of the control circuitry described for FIG. 1 to provide control of the control and gate drive module 118. The current sense module 405 includes the functionality of MOSFET 184 as described with respect to FIG. 1. Once the error amplifier 140 sets the peak current target within a given cycle, the predictive adaptive timer module 408 provides an off-time.

Embodiments provide various advantages over conventional circuits. An example advantage is the high accuracy due to monitoring the voltage drop across the first resistor 130 being sufficient for the CLIM clamp module 402. As a result, the operating characteristics of the first nMOSFET 128, the second nMOSFET 150, and the one or more nMOSFETs 228 and 230, have essentially no impact (e.g., with respect to process, temperature, and operating point) on the CLIM clamp module 402 and the SKIP clamp module 404. The second resistor 158 and the resistor 224 can match the first resistor 130, thereby contributing to accuracy.

Another advantage is that a relatively small current is sufficient for the voltage-to-current circuit 126. The input signal to the CLIM clamp module 402 and the SKIP clamp module 404 are essentially independent of quiescent current during a skip mode, where, for example, the skip mode is entered into to improve light load efficiency. In a skip mode, the quiescent current in the path provided by the second nMOSFET 150, the second resistor 158, and the resistor 224 can be reduced by increasing the resistance of the resistor 224.

Another advantage is that the voltage drop across the first resistor 130 can be used for both the SKIP clamp module 404 and the CLIM clamp module 402.

Another advantage is that the current path in the voltage-to-current circuit 126 is connected to the input voltage $V_{IN}$. Even at a low input voltage $V_{IN}$, the voltage drop across the second pMOSFET 184 does not limit the drain-to-source voltage drops across the first nMOSFET 128 and the one or more nMOSFETs 228 and 230. This provides the possibility for low input voltage applications, where a replica path can be used to compare the voltage drop over the first resistor 130 vis a vis the second resistor 158, and depending on the difference in the error amplifier 140 clamp voltage, this can be limited further, e.g., if the second pMOSFET 184 enters its saturation region and the error amplifier 140 output doesn't corresponds to the voltage drop over the second resistor 158. This situation can be detected by comparing the voltage drop over the second resistor 158 and the first resistor 130. At very low input voltage applications, there can be improved settling after a line transient step (e.g., a low input voltage $V_{IN}$ to a max input voltage $V_{IN}$ step) and load transient response (e.g., a high load current to a low load current at low $V_{IN}$) if the error amplifier 140 output gets clamped accordingly.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means+/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. An integrated circuit comprising:
   a high-side pMOSFET comprising a drain and a gate;
   a node coupled to the drain of the high-side pMOSFET;
   a voltage-to-current circuit comprising a first nMOSFET and a first resistor, the first nMOSFET comprising a gate and a source, the first resistor comprising a terminal coupled to the source of the first nMOSFET;
   an error amplifier comprising an output port coupled to the gate of the first nMOSFET;
   a skip clamp nMOSFET comprising a source coupled to the output port of the error amplifier; and
   a current limit clamp pMOSFET comprising a source coupled to the output port of the error amplifier.

2. The integrated circuit of claim 1, further comprising:
   a first transconductance amplifier comprising a first input port coupled to the terminal of the first resistor, and an output port coupled to a gate of the skip clamp nMOSFET; and
   a second transconductance amplifier comprising a first input port coupled to the terminal of the first resistor, and an output port coupled to a gate of the current limit clamp pMOSFET.

3. The integrated circuit of claim 2, the first transconductance amplifier comprising a second input port and the second transconductance amplifier comprising a second input port, the integrated circuit further comprising:
   a resistor ladder network;
   a first switch network coupled to the resistor ladder network and to the second input port of the first transconductance amplifier; and
   a second switch network coupled to the resistor ladder network and to the second input port of the second transconductance amplifier.

4. The integrated circuit of claim 3, further comprising:
   a second nMOSFET comprising a gate coupled to the output port of the error amplifier, a drain, and a source;
   a second resistor comprising a terminal coupled to the source of the second nMOSFET; and
   a comparator comprising a first input port coupled to the node, a second input port coupled to the drain of the second nMOSFET, and an output port coupled to the gate of the high-side pMOSFET.

5. The integrated circuit of claim 4, further comprising:
   a control and gate drive module coupled to the output port of the comparator and to the gate of the high-side pMOSFET, the output port of the comparator coupled to the gate of the high-side pMOSFET by way of the control and gate drive module.

6. The integrated circuit of claim 4, further comprising:
   a first pMOSFET comprising a source coupled to the node, a gate coupled to the gate of the high-side pMOSFET, and a drain coupled to the first input port of the comparator, the first input port of the comparator coupled to the drain of the high-side pMOSFET by way of the first pMOSFET.

7. The integrated circuit of claim 2, further comprising:
a second nMOSFET comprising a gate coupled to the output port of the error amplifier, a drain, and a source;
a second resistor comprising a terminal coupled to the source of the second nMOSFET; and
a comparator comprising a first input port coupled to the node, a second input port coupled to the drain of the second nMOSFET, and an output port coupled to the gate of the high-side pMOSFET.

8. The integrated circuit of claim 7, the voltage-to-current circuit further comprising:
stacked nMOSFETs coupled in series with the first nMOSFET, each nMOSFET in the stacked nMOSFETs having a gate coupled to the gate of the second nMOSFET, the stacked nMOSFETs coupled to a voltage input.

9. The integrated circuit of claim 7, further comprising:
a control and gate drive module coupled to the output port of the comparator and to the gate of the high-side pMOSFET, the output port of the comparator coupled to the gate of the high-side pMOSFET by way of the control and gate drive module.

10. The integrated circuit of claim 7, further comprising:
a first pMOSFET comprising a source coupled to the node, a gate coupled to the gate of the high-side pMOSFET, and a drain coupled to the first input port of the comparator, the first input port of the comparator coupled to the drain of the high-side pMOSFET by way of the first pMOSFET.

11. A system comprising:
an inductor comprising a first terminal and a second terminal;
a voltage divider coupled to the second terminal of the inductor;
an integrated circuit comprising:
  a high-side pMOSFET comprising a gate, and a drain coupled to the first terminal of the inductor;
  a voltage-to-current circuit comprising a first nMOSFET and a first resistor, the first nMOSFET comprising a gate and a source, the first resistor comprising a terminal coupled to the source of the first nMOSFET;
  a voltage reference;
  an error amplifier comprising an output port coupled to the gate of the first nMOSFET, a first input port coupled to the voltage reference, and a second input port coupled to the voltage divider;
  a skip clamp nMOSFET comprising a source coupled to the output port of the error amplifier; and
  a current limit clamp pMOSFET comprising a source coupled to the output port of the error amplifier.

12. The system of claim 11, the integrated circuit further comprising:
a first transconductance amplifier comprising a first input port coupled to the terminal of the first resistor, and an output port coupled to a gate of the skip clamp nMOSFET; and
a second transconductance amplifier comprising a first input port coupled to the terminal of the first resistor, and an output port coupled to a gate of the current limit clamp pMOSFET.

13. The system of claim 12, the first transconductance amplifier comprising a second input port and the second transconductance amplifier comprising a second input port, the integrated circuit further comprising:
a resistor ladder network;
a first switch network coupled to the resistor ladder network and to the second input port of the first transconductance amplifier; and
a second switch network coupled to the resistor ladder network and to the second input port of the second transconductance amplifier.

14. The system of claim 12, the integrated circuit further comprising:
a second nMOSFET comprising a gate coupled to the output port of the error amplifier, a drain, and a source;
a second resistor comprising a terminal coupled to the source of the second nMOSFET; and
a comparator comprising a first input port coupled to the drain of the high-side pMOSFET, a second input port coupled to the drain of the second nMOSFET, and an output port coupled to the gate of the high-side pMOSFET.

15. The system of claim 14, the voltage-to-current circuit further comprising:
stacked nMOSFETs coupled in series with the first nMOSFET, each nMOSFET in the stacked nMOSFETs having a gate coupled to the gate of the second nMOSFET, the stacked nMOSFETs coupled to a voltage input.

16. The system of claim 14, the integrated circuit further comprising:
a control and gate drive module coupled to the output port of the comparator and to the gate of the high-side pMOSFET, the output port of the comparator coupled to the gate of the high-side pMOSFET by way of the control and gate drive module.

17. The system of claim 14, the integrated circuit further comprising:
a first pMOSFET comprising a source coupled to the drain of the high-side pMOSFET, a gate coupled to the gate of the high-side pMOSFET, and a drain coupled to the first input port of the comparator, the first input port of the comparator coupled to the drain of the high-side pMOSFET by way of the first pMOSFET.

18. An integrated circuit comprising:
a high-side pMOSFET comprising a drain and a gate;
a node coupled to the drain of the high-side pMOSFET;
a voltage-to-current circuit comprising a first nMOSFET and a first resistor, the first nMOSFET comprising a gate and a source, the first resistor comprising a terminal coupled to the source of the first nMOSFET;
an error amplifier comprising an output port coupled to the gate of the first nMOSFET;
a skip clamp nMOSFET comprising a source coupled to the output port of the error amplifier;
a current limit clamp pMOSFET comprising a source coupled to the output port of the error amplifier;
a second nMOSFET comprising a gate coupled to the output port of the error amplifier, a drain, and a source; and
a second resistor comprising a terminal coupled to the source of the second nMOSFET.

* * * * *